(12) United States Patent
Hassett

(10) Patent No.: US 9,378,515 B1
(45) Date of Patent: Jun. 28, 2016

(54) PROXIMITY AND TIME BASED CONTENT DOWNLOADER

(75) Inventor: Stephen D. Hassett, Atlanta, GA (US)

(73) Assignee: TWC Patent Trust LLT, Burlington, VT (US)

( * ) Notice: Subject to any disclaimer, the term of this patent is extended or adjusted under 35 U.S.C. 154(b) by 1652 days.

(21) Appl. No.: 12/351,180

(22) Filed: Jan. 9, 2009

(51) Int. Cl.
*G06Q 30/02* (2012.01)

(52) U.S. Cl.
CPC ........ *G06Q 30/0261* (2013.01); *G06Q 30/0251* (2013.01); *G06Q 30/0259* (2013.01)

(58) Field of Classification Search
USPC .......................................... 709/217, 218, 219
See application file for complete search history.

(56) References Cited

U.S. PATENT DOCUMENTS

| | | | | |
|---|---|---|---|---|
| 4,674,041 A * | 6/1987 | Lemon | ........ | G06Q 20/387 235/381 |
| 5,500,681 A * | 3/1996 | Jones | ........ | G06Q 20/387 348/473 |
| 5,978,013 A * | 11/1999 | Jones | ........ | G06Q 20/387 348/465 |
| 6,297,766 B1 | 10/2001 | Koeller | | |
| 6,389,290 B1 | 5/2002 | Kikinis et al. | | |
| 6,415,281 B1 | 7/2002 | Anderson | | |
| 6,510,434 B1 | 1/2003 | Anderson et al. | | |
| 6,590,529 B2 | 7/2003 | Schwoegler | | |
| 6,970,871 B1 * | 11/2005 | Rayburn | ........ | G06Q 30/02 |
| 6,993,326 B2 | 1/2006 | Link, II et al. | | |
| 7,466,986 B2 * | 12/2008 | Halcrow | ........ | H04W 48/16 455/456.1 |
| 7,589,628 B1 * | 9/2009 | Brady, Jr. | ........ | G01C 21/20 340/10.1 |
| 7,747,468 B2 * | 6/2010 | Ji | ........ | G06Q 20/1235 705/26.1 |
| 7,827,149 B2 * | 11/2010 | Kodama | ........ | G06F 11/1451 707/661 |
| 8,090,799 B2 * | 1/2012 | Keeler | ........ | G06Q 30/02 705/14.4 |
| 2002/0010630 A1 * | 1/2002 | Kitamura | ........ | G06Q 30/02 705/14.69 |
| 2002/0069176 A1 * | 6/2002 | Newman | ........ | 705/53 |
| 2002/0077745 A1 * | 6/2002 | Ohmura | ........ | G01C 21/32 701/451 |

(Continued)

OTHER PUBLICATIONS

U.S. Appl. No. 09/770,338, filed Jan. 26, 2001, Fennel et al., Unpublished.

(Continued)

*Primary Examiner* — Backhean Tiv
(74) *Attorney, Agent, or Firm* — Meunier Carlin & Curfman LLC

(57) ABSTRACT

Methods and systems for transmitting content to a device. In some embodiments, methods include receiving location information relating to a device, the location information usable to identify an approximate location of the device; comparing the approximate location of the device with a location of a venue, wherein the venue is associated with at least one feature; and transmitting content to the device if the approximate location of the device is within a pre-determined range of the location of the venue, wherein at least a portion of the content relates to the at least one feature. In certain embodiments, the user receives the content without the need for the user to be aware of and seek out that content. In certain embodiments, the content may have a relationship to the particular venue, or in other words, the content may be applied for use at that venue. In certain embodiments the transmission of content to the device depends not only on the user's location, but also on the particular time of transmission. In other embodiments content is selected based upon whether the approximate location of the device is within a portion of a pre-determined range of the location of the venue.

30 Claims, 7 Drawing Sheets

(56) References Cited

U.S. PATENT DOCUMENTS

| | | | | |
|---|---|---|---|---|
| 2002/0077910 | A1* | 6/2002 | Shioda | G01C 21/26 705/14.69 |
| 2002/0099606 | A1* | 7/2002 | Shlagman | G06Q 30/02 705/14.58 |
| 2002/0163547 | A1* | 11/2002 | Abramson | G01C 21/367 715/855 |
| 2002/0184302 | A1* | 12/2002 | Prueitt | G06Q 30/02 709/203 |
| 2002/0194130 | A1* | 12/2002 | Maegawa et al. | 705/51 |
| 2003/0011494 | A1* | 1/2003 | Reider et al. | 340/993 |
| 2003/0177058 | A1* | 9/2003 | Needham | G06Q 30/0645 705/307 |
| 2003/0212684 | A1 | 11/2003 | Meyer et al. | |
| 2003/0220835 | A1* | 11/2003 | Barnes, Jr. | G06Q 10/1053 705/14.36 |
| 2003/0236711 | A1* | 12/2003 | Deguchi | G06Q 30/0601 705/26.1 |
| 2004/0073484 | A1* | 4/2004 | Camporeale | G06Q 30/0241 705/14.4 |
| 2004/0204063 | A1* | 10/2004 | Van Erlach | 455/556.1 |
| 2004/0215692 | A1* | 10/2004 | Vasudevan | H04L 67/16 709/201 |
| 2005/0143094 | A1* | 6/2005 | Reed | H04W 4/00 455/456.2 |
| 2005/0171863 | A1* | 8/2005 | Hagen | G06Q 30/0601 705/26.1 |
| 2005/0175160 | A1* | 8/2005 | Simpson | G06Q 10/087 379/88.13 |
| 2005/0216365 | A1* | 9/2005 | Lagge | G06Q 30/0611 705/26.4 |
| 2005/0273351 | A1* | 12/2005 | Chudnovsky | G06Q 30/02 705/1.1 |
| 2006/0149679 | A1* | 7/2006 | Nishizawa | G06Q 30/02 705/51 |
| 2006/0149734 | A1* | 7/2006 | Egnor | G06F 17/3087 |
| 2006/0194569 | A1* | 8/2006 | Hsueh | G06Q 30/02 455/412.1 |
| 2006/0242009 | A1* | 10/2006 | Crolley | G06Q 30/02 705/14.64 |
| 2006/0265737 | A1* | 11/2006 | Morris | 726/3 |
| 2007/0150297 | A1* | 6/2007 | Olson | G06Q 30/02 705/4 |
| 2007/0214040 | A1* | 9/2007 | Patel | G06Q 30/02 705/14.17 |
| 2007/0226053 | A1* | 9/2007 | Carl | G06Q 30/02 705/14.39 |
| 2008/0072139 | A1* | 3/2008 | Salinas | G06F 17/30905 715/238 |
| 2008/0200207 | A1* | 8/2008 | Donahue | H04M 1/7253 455/556.2 |
| 2008/0214166 | A1* | 9/2008 | Ramer | G06Q 30/0257 455/414.3 |
| 2008/0222030 | A1* | 9/2008 | Fischler | G06Q 20/10 705/39 |
| 2008/0262928 | A1* | 10/2008 | Michaelis | G06Q 30/02 705/14.26 |
| 2008/0283599 | A1 | 11/2008 | Rasband et al. | |
| 2008/0292071 | A1* | 11/2008 | Rand | H04M 3/4878 379/88.22 |
| 2008/0311957 | A1* | 12/2008 | Jantunen et al. | 455/560 |
| 2009/0030779 | A1* | 1/2009 | Tollinger | G06Q 30/02 705/14.1 |
| 2009/0061884 | A1* | 3/2009 | Rajan | G06Q 30/02 455/445 |
| 2009/0076887 | A1* | 3/2009 | Spivack | G06Q 30/02 705/14.69 |
| 2009/0089184 | A1* | 4/2009 | Boush | G06F 17/30017 705/26.1 |
| 2009/0112460 | A1* | 4/2009 | Baker | G06Q 20/102 701/532 |
| 2009/0191892 | A1* | 7/2009 | Kelley | 455/456.1 |
| 2009/0222328 | A1* | 9/2009 | Figueroa et al. | 705/10 |
| 2009/0316671 | A1* | 12/2009 | Rolf et al. | 370/338 |
| 2010/0042519 | A1* | 2/2010 | Dingler | G01S 5/0009 705/30 |
| 2010/0057562 | A1* | 3/2010 | Gabbay | G06Q 30/0254 705/14.52 |
| 2010/0070169 | A1* | 3/2010 | Paulin | G01C 21/26 701/467 |
| 2010/0121697 | A1* | 5/2010 | Lin et al. | 705/14.14 |
| 2011/0061003 | A1* | 3/2011 | Miyazawa | G06Q 30/02 715/746 |
| 2013/0094538 | A1* | 4/2013 | Wang | H04B 1/707 375/141 |
| 2014/0052510 | A9* | 2/2014 | Milone | G06Q 10/10 705/14.11 |

OTHER PUBLICATIONS http://maps.live.com, Jan. 9, 2009.
http://www.motionbased.com, Oct. 14, 2008.
http://www.motionbased.com, Jan. 1, 2008.
http://www.amazon.com: Garmin 010-00467-00 Forerunner 305 GPS Receiver with Heart Rate, Oct. 14, 2008.
http://www.amazon.com: Garmin 010-00467-00 Forerunner 305 GPS Receiver with Heart Rate, Dec. 31, 2007.
http://www.trainingpeaks.com, Oct. 14, 2008.
http://www.trainingpeaks.com, Jan. 2, 2008.
http://flickr.com, Jan. 9, 2009.
http://flickr.com, Jan. 19, 2008.
http://bonesinmotion.com/corp/index.html, Oct. 20, 2008.

* cited by examiner

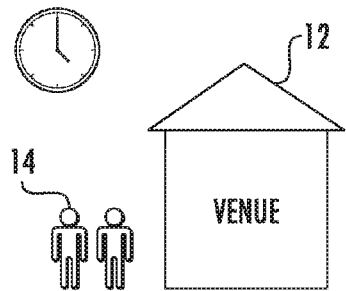
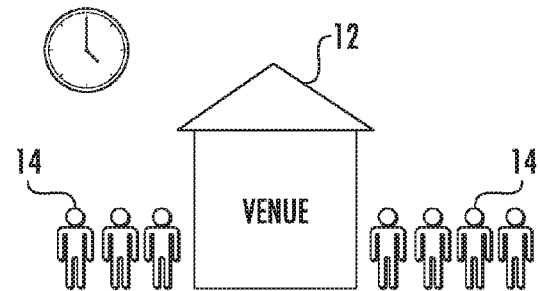
FIG. 4A     FIG. 4B
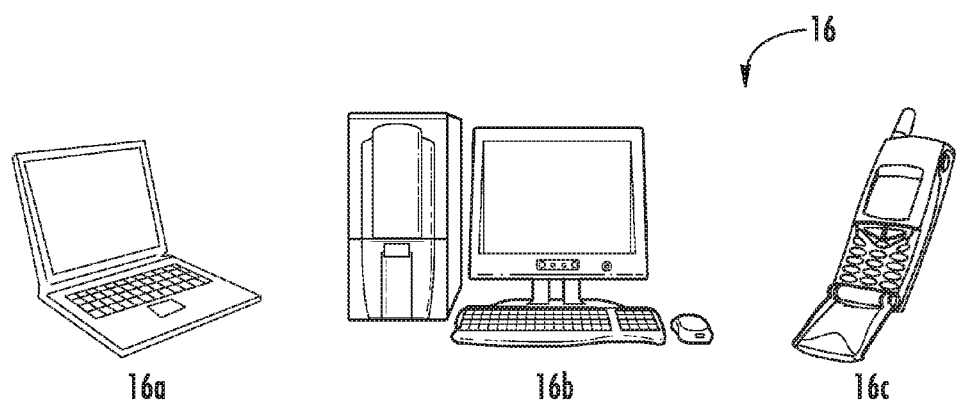
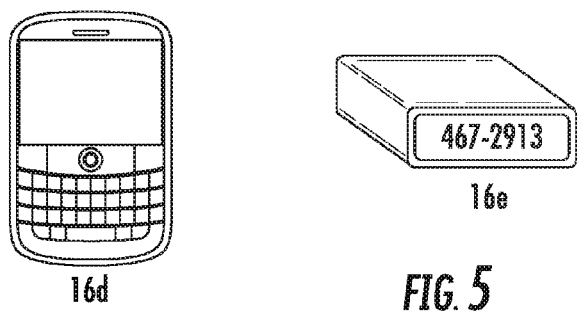
FIG. 5

PROXIMITY AND TIME BASED CONTENT DOWNLOADER

FIELD

The present disclosure relates to systems and methods for providing content to a user's device, and more specifically, to providing content based on a user's location.

BACKGROUND

Many people use the Internet to research information about a specific venue. For example, a user may use the Internet in order to research restaurants that are available in or around the Atlanta, Ga. location of an amusement park known as Six Flags®, operated by the company Six Flags Theme Parks, Inc. The user would use a device to access a website on the Internet that provides the needed information. One website might be Live Search Maps, which is accessible via the Uniform Resource Locator ("URL") http://maps.live.com/. This website is offered by Microsoft Corp., located in Seattle, Wash. Users may access the Internet, find the Live Search website, and enter the location of any venue. The user does not necessarily have to be at a venue in order to research the venue. Live Search will return a map of the venue, along with information such as restaurants that are nearby. Another service might be the Six Flags website, which is accessible via the URL http://www.sixflags.com.

Accessing information from a website on the Internet requires several steps. First, the user's device requests content from the website. The website receives the request and thereafter causes content to be transmitted over the Internet to the device. The device receives the transmitted content and displays it for the user. Although these steps may occur relatively quickly, the user must often proceed through a series of steps to find the content the user really needs.

For example, the first content that is displayed for the user is the website's home page, which contains graphics and other generic information. Providing specific information from the home page of a website is not desirable because doing so may look cluttered and unattractive. For example, the Six Flags website indicates that there are twelve theme park locations in ten different states. Providing specific information for each location directly from the home page of the Six Flags website would be cluttered and overwhelming for users. Therefore, most websites offer hyperlinks that allow the user to access more specific content. For example, a user may follow a hyperlink to gain more information about the Atlanta, Ga. location, and from there follow a hyperlink to gain more information about restaurants within that location. Each time the user clicks on a hyperlink, the user's device requests content, the website receives the request and transmits the content to the device, and the user's device receives and displays the content. As this series of hyperlinks demonstrates, one problem with traditional methods of accessing content is that a user must actively seek out and sort through many pages of content.

Another problem associated with traditional methods of accessing content is that the user might be unaware the content is available. In the example above, the user at Six Flags might not be aware that the website contains information about restaurants or that the website had coupons for dinner specials. Without knowing about the dinner specials, the user might have foregone eating at Six Flags altogether. Therefore, Six Flags would lose the profit on the user's dinner that it would have made had the user been aware of the special. Also, the user would be forced to leave the park and find a more reasonably-priced dinner elsewhere.

As illustrated by the Six Flags example above, downloading content benefits users by providing needed information. It benefits venues such as Six Flags by distributing information and increasing the knowledge base of users at the venue. These traditional methods of informing users are lacking, however, because they do not provide content in real-time. In general, they require a user to access the Internet and research the venue in advance. But it is not always convenient for users who are already at a venue to research information about that venue. For example, as discussed above it is often inconvenient to navigate hyperlinks on a website. Also, the user must actively seek out the content—it is not delivered in real time.

Additionally, traditional methods are lacking because the transmission of content does not depend on a user's location—in other words, traditional methods do not track the location of a user and provide content based on that location. While there are known methods that can track a user's location, they do not provide content based on the user's location. For example, there are sports watches that use Global Positioning System (hereinafter, "GPS") to track a runner's path. One example of such a sports watch is the Forerunner 305 model, manufactured by Garmin International, Inc., located in Olathe, Kans. Once the run is over, the runner can connect the Forerunner 305 to a device that has Internet access in order to use Internet-based software to obtain more information, such as running routes or suggested training programs and diets based on the run data. Examples of such Internet-based software include a program called MotionBased®—also provided by Garmin International, Inc. —and TrainingPeaks—provided by Peaksware, LLC, located in Lafayette, Colo. While these systems are able to track a user's location using GPS, they do not provide specific content in real-time based on the user's location.

Accordingly, there is a need for systems and methods that provide real-time content to a user based on that user's location, where the content is tailored for that location, without the need for the user to be aware of and seek that content.

SUMMARY

Certain embodiments disclosed herein provide a method for transmitting content to a device, comprising: receiving a request for content from a device, the request for content usable to identify an approximate location of the device; comparing the approximate location of the device with a location of a venue, wherein the venue is associated with at least one feature; and if the approximate location of the device is within a pre-determined range of the location of the venue, transmitting content to the device for a first fee, but if the approximate location of the device is outside the pre-determined range, transmitting content to the device for a second fee, wherein the first fee is less than the second fee.

According to some embodiments, the method further comprises selecting the content from a plurality of content by determining whether the approximate location of the device is within a pre-determined portion of the pre-determined range.

According to some embodiments, the method further comprises selecting the content from a plurality of content by determining whether the approximate location of the device has been within the pre-determined range for a pre-determined time range.

According to some embodiments, content is transmitted to the device only if a time of transmission of the content corresponds to a pre-selected time or time range.

According to some embodiments, the device comprises at least one of a computer, a cell phone, a pager, or a mobile electronic device.

According to some embodiments, the content comprises at least one of applications, executable programs, text, SMS, or HTML files, mp3 or other audio files, websites, wallpapers or themes, graphic images, ringtones, advertisements, coupons, movies, animation clips, or photographs.

According to some embodiments, the venue comprises a plurality of places, and the location of the venue is pre-determined as a location within one place.

According to some embodiments, at least a portion of the content relates to the at least one feature.

According to some embodiments, the first fee is free.

According to some embodiments, the venue pays at least one of the first fee or the second fee.

According to some embodiments, an owner of the device pays at least one of the first fee or the second fee.

Certain embodiments disclosed herein provide a system for transmitting content to a device, comprising: a location comparison component for receiving a request for content from a device, the request usable to identify an approximate location of the device, wherein the location comparison component compares the approximate location of the device with a location of a venue, wherein the venue is associated with at least one feature; a content selection component for selecting content; and a transmission component for transmitting content to the device for a first fee if the approximate location of the device is within a pre-determined range of the location of the venue, and for transmitting content to the device for a second fee if the approximate location of the device is outside the pre-determined range, wherein the first fee is less than the second fee.

According to some embodiments, the content selection component selects content from a plurality of content by determining whether the approximate location of the device has been within the pre-determined range for a pre-determined time range.

According to some embodiments, a first pre-determined time range corresponds to a first content, and a second pre-determined time range corresponds to a second content, and wherein the second pre-determined time range is longer than the first pre-determined time range.

According to some embodiments, at least a portion of the content relates to the at least one feature.

According to some embodiments, the content is an application that allows a user to input information and provides specialized content in response to the users input.

According to some embodiments, the content: provides further information about the venue; may be used at the venue; may be used as at least partial payment for an item or service for sale at the venue; is a promotion for an item or service for sale at the venue; or is an incentive to visit the venue again.

According to some embodiments, the venue pays the first fee and an owner of the device pays the second fee.

Certain embodiments disclosed herein provide a method for transmitting content to a device, comprising: receiving a request for content from a device; receiving location information relating to the device, the location information usable to identify an approximate location of the device; comparing the approximate location of the device with a location of a venue, wherein the venue is associated with at least one feature; and if the approximate location of the device is within a pre-determined range of the location of the venue, transmitting content to the device for a first fee that is charged to the venue, but if the approximate location of the device is outside the pre-determined range, transmitting content to the device for a second fee that is charged to the owner of the device.

According to some embodiments, the content is an application that receives user input and returns information that is related thereto in response to the users input.

According to some embodiments, the content is an application that receives information related to a location from the user and returns a weather forecast in response to the users input.

According to some embodiments, the information related to the location comprises at least one of the name of the venue, a zip code, an area code, a city, a state, or a county name.

According to some embodiments, the content is an application that is installed on the device and executed on the device.

According to some embodiments, the method further comprises selecting content from a plurality of content by determining whether the approximate location of the device has been within the pre-determined range for a pre-determined time range.

Certain embodiments disclosed herein provide a system for transmitting content to a device, comprising: a location comparison component for receiving a request for content from a device, the request usable to identify an approximate location of the device, wherein the location comparison component compares the approximate location of the device with a location of a venue, wherein the venue is associated with at least one feature; a content selection component for selecting content from a plurality of content by determining whether the approximate location of the device is within one of a plurality of pre-determined ranges of the location of the venue; and a transmission component for transmitting content to the device if the approximate location of the device is within one of the plurality of pre-determined ranges.

According to some embodiments, each of the plurality of content corresponds to each of the plurality of pre-determined ranges.

According to some embodiments, a first pre-determined range is within the venue and corresponds to a first content, and a second pre-determined range is outside of the venue and corresponds to a second content, and wherein the first content has a higher value than the second content.

According to some embodiments, at least a portion of the content relates to the at least one feature.

According to some embodiments, the feature comprises at least one of access rights, a theme, a purpose, a person, event, a game, a sport, or an activity.

According to some embodiments, the transmission component only transmits content to the device if a time of transmission of the content corresponds to a pre-selected time or time range.

Certain embodiments disclosed herein provide a computer-readable medium on which is encoded program code, the program code comprising: program code for receiving a request for content from a device; program code for receiving location information relating to the device, the location information usable to identify an approximate location of the device; program code for comparing the approximate location of the device with a location of a venue, wherein the venue is associated with at least one feature; and program code for transmitting content to the device if the approximate location of the device is within a pre-determined range of the location of the venue, wherein at least a portion of the content relates to the at least one feature.

BRIEF DESCRIPTION OF THE FIGURES

FIG. 4A shows a venue and users at one time, and FIG. 4B shows a venue and users at a different time according to certain embodiments.

FIG. 5 shows various devices according to certain embodiments.

DETAILED DESCRIPTION OF THE FIGURES

Figure 3:
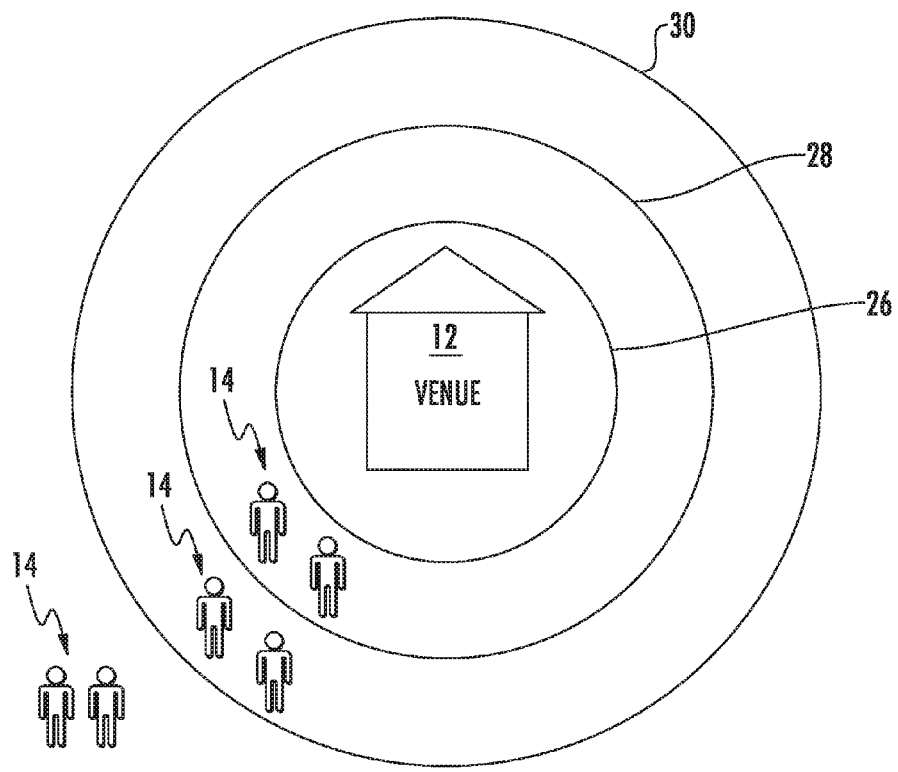
FIG. 3 shows a venue and users within various locations according to certain embodiments.

In certain embodiments, systems and methods provide real-time content to a user based on that user's location, where the content is tailored for that location. For example, as will be explained in more detail herein, a user 14 may visit a particular venue 12. While at the venue 12, the user 14 may use a device 16 to send a request 36 to a service provider 22 for content 18. Methods can be used to verify that the user 14 is within a particular range 26-30 of the venue 12, as shown in FIG. 3. If the user 14 is within a particular range 26-30, then a service provider 22 may cause content 18 to be transmitted to the user's device 16. The content 18 may be tailored for the specific venue 12. For example, if the venue 12 is an amusement park in Atlanta, Ga., then the content 18 may contain weather forecasts, park hours, and ticket prices for that particular amusement park venue 12. The user's device 16 may display the content 18 on the device 16. Aspects of the invention are explained in more detail below.

Figure 1:
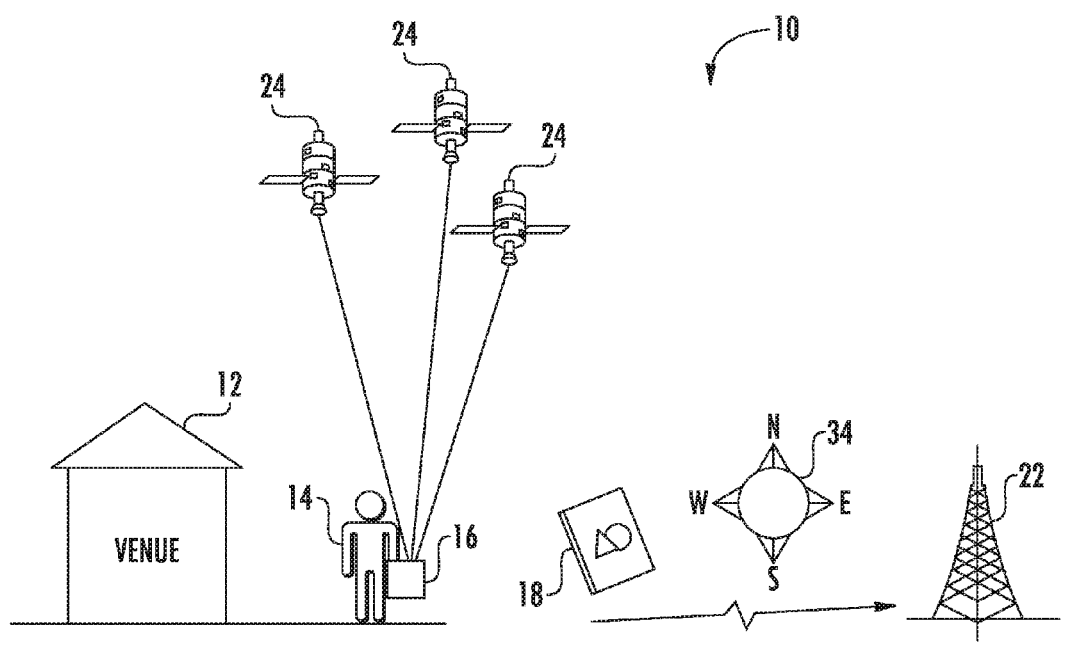
FIG. 1 shows a system according to certain embodiments.
Figure 2A:
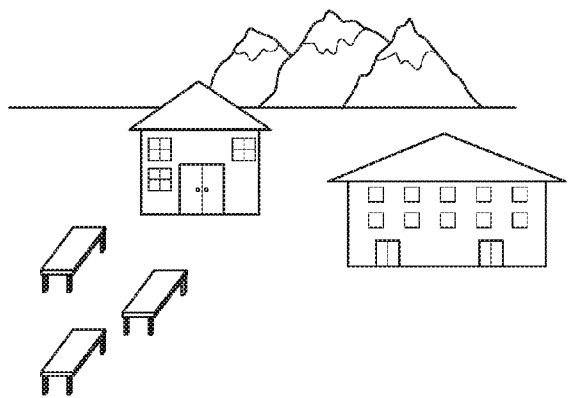
FIGS. 2A and 2B show venues according to certain embodiments.
Figure 2B:
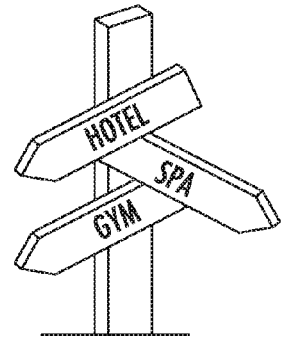

FIG. 1 is a schematic showing a system 10 that consists of a venue 12, a user 14, a user's device 16, content 18, a content provider 20, a service provider 22, and GPS satellites 24. As shown in FIG. 2, the venue 12 may include a single location associated with a feature, or a plurality of locations nearby to one another that are associated with a feature. The feature may include access rights, a theme, a purpose, a person, event, a game, a sport, or an activity. As non-limiting examples, a venue 12 may include a ski resort, ball park or sporting arena, golf course, amusement park, retail store such as a grocery store or a department store, hotel, museum, school, church, theater, or park. As shown in FIG. 2A, if the venue 12 is a ski resort there may be several locations—such as the main lodge, guest quarters, mountain ranges, or outdoor pavilions—that are associated with the ski resort. All the locations are part of the ski resort venue because they are associated with the feature of skiing. As another example, if the venue 12 is a hotel there may be several locations such as a spa, a pool, and a gymnasium, such as in FIG. 2B. All the locations are part of the hotel because they are associated with the feature of a guest's access rights, or alternatively, the feature of staying at the hotel. As this hotel example demonstrates, there may be more than one feature that is associated with the locations of the venue.

The device 14 may be any computing device that can send a request 36, receive and display content 18, and that also contains a GPS receiver, component, or feature that is usable to identify an approximate location of the device 16. Many types of devices 16 may be used. Exemplary devices are illustrated in FIG. 5. FIG. 5 shows devices including a laptop computer 16a, a desktop computer 16b, a cell phone 16c, a pager 16e, and a personal electronic device (PED) 16d, such as a BlackBerry®. A device 16 is not necessarily limited to the particular embodiments illustrated in FIG. 5, however, and also includes any computing device 16 that can send a request 36, receive and display content 18, and that also contains a component or feature that is usable to identify an approximate location of the device 16.

Content 18 that is available for download may take on many forms—including applications and executable programs, text, SMS, or HTML files, mp3 or other audio files, websites, wallpapers and themes to display on the PED graphic user interface, other graphic images, ringtones, advertisements, coupons, movies, animation clips, or photographs. In some embodiments the content 18 relates to the feature of the venue 12. In FIG. 2A where the venue 12 is a ski resort and the feature is skiing, the content 18 may be ski coupons. As another example, in FIG. 2B where the venue 12 is a hotel and the feature is access rights to the hotel, the content 18 may be a free pass to gain entry to the executive level gymnasium. In these embodiments the content 18 is related to a feature of the venue 12 because, for example, the content 18 may provide further information about the venue 12, it may be applied at that venue 12, used as partial compensation for an item or service for sale at the venue 12, as a promotion for an item or service at the venue 12, or as an incentive to visit the venue 12 again.

In some embodiments the content 18 may be an application, executable, or a computer program. For example, the content 18 may be a game or application that provides more specific content in response to a user's input. For example, there may be an application that returns a special weather forecast in response to the entry of a zip code by the user. Alternatively, there may be an application that returns scores of sports games in response to the entry of the name of a team by the user. In some embodiments the content 18 may be a free application that would otherwise be available for a fee. For example, the application might be a tax program that helps a user complete his or her tax forms. In general, the tax program may be available for purchase at a retail store. In some embodiments, however, users 14 who patronize a particular venue 12—such as an accountant's convention—may receive the tax program for free, or otherwise at a discount.

Content 18 may be created or provided by a content provider 20. A content provider 20 is any entity that creates or otherwise makes available content 18 as defined above. For example, a content provider 20 may be a photography service that creates photographs, a publisher that creates magazine articles, a meteorologist that creates weather forecasts, or a recording artist that creates music. There is also a service provider 22 that facilitates the transmission or other delivery of content 18. As described in more detail below, in certain embodiments the service provider 22 is a separate entity from the content provider 20, whereas in other embodiments the service provider 22 and content provider 20 are the same entity.

The service provider 22 may comprise any computing device that can receive a request 36 from a device, receive or determine location information 34 related to a device 16, store information relating to venues 12, and transmit content 18 to a user's device 16. For example, the service provider 22 may be a computer or a server. The service provider 22 may have special software that enables it to receive or determine location information 34 relating to a device 16. The service provider 22 may have memory that stores the location information 34 in a database. The memory and database may further store information relating to a venue 12. For example, the service provider 22 may store information about the venue's 12 location or ranges 26-30 surrounding the venue 12, in order to compare the location of the venue 12, the ranges 26-30, and the location information 34 of the device 16, as explained in more detail below. Also, the service provider 22 may store information relating to the content 18.

Figure 6A:
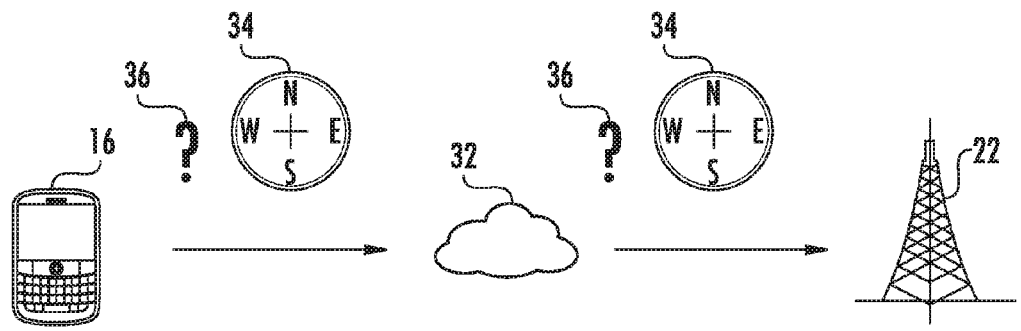
FIGS. 6A-6C show communications between a service provider and a user's device according to certain embodiments.
Figure 6B:
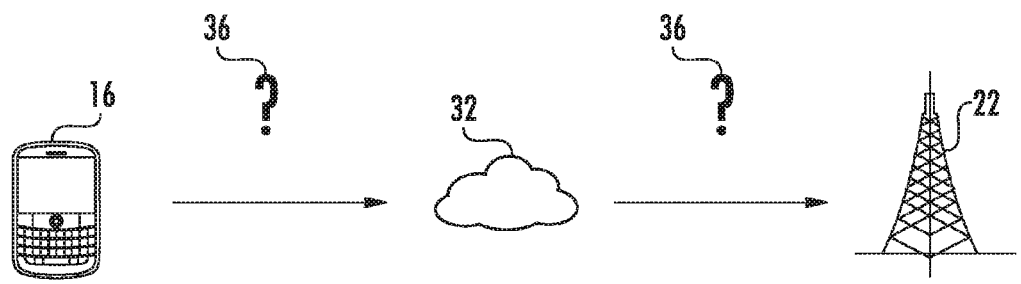
Figure 11:
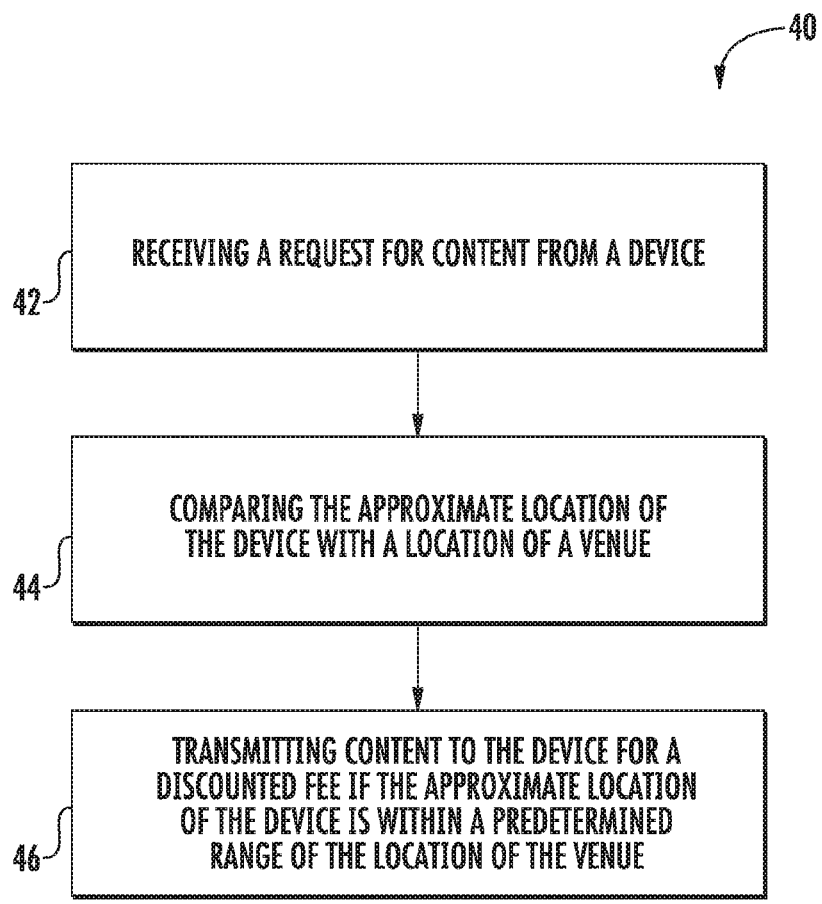
FIG. 11 shows a method for transmitting content according to certain embodiments.

FIG. 11 illustrates a method 40 according to an embodiment of the invention. There may be a step 42 that includes receiving a request 36 for content 18 from a device 16. A request 36 may take on many forms, including an electronic mail message, a text message, clicking on a hyperlink, accessing a website, or any other communication that indicates a request for content 18. As shown in FIGS. 6A and 6B, the user 14 might use his or her device 16 to send the request 16 through the Internet 32 or other communications network to the service provider 22. In some embodiments, the request 36 may be usable to identify an approximate location of the device 16. Methods for determining the approximate location of the device 16 are explained in more detail below. There may also be a step 44 of comparing the approximate location of the device 16 with a location of a venue 12. Further, there may be a step 46 of transmitting content 18 to the device 16 for a discounted fee if the approximate location of the device 16 is within a pre-determined range of the location of the venue 12. In some embodiments, the content 18 is otherwise available for a non-discounted fee if the device 16 is outside of the pre-determined range of the location of the venue 12.

Figure 6C:
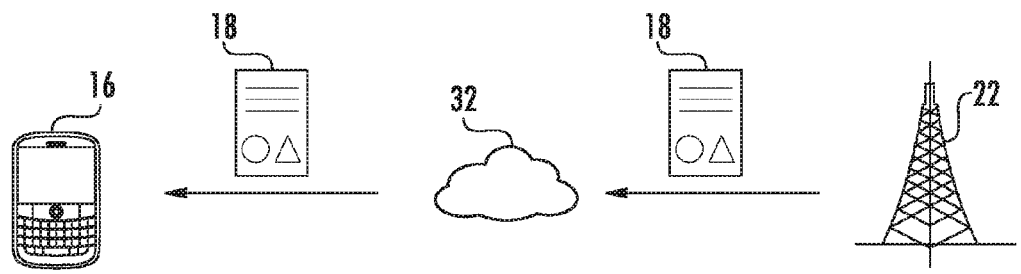

Content 18 may be transmitted to a user's device 16 in a number of ways. For example, as shown in FIG. 6C, the service provider 22 can have access to the Internet 32 or other communications network, and can transmit content 18 to the user's device 16 wirelessly through the Internet 32. Alternatively, the service provider 22 may transmit content 18 through radio waves. There may be one service provider 22 or several service providers 22. Embodiments with several service providers 22 may result in increased transmission ranges, because the content 18 could be transmitted among several service providers 22 before being transmitted to a user's device 16.

The approximate location of the user's device 16 may be determined in one of several ways. In one embodiment as shown in FIG. 6A, the device 16 contains a GPS receiver. The GPS receiver determines the approximate location of the device 16 based on information received from the GPS satellites 24. The device 16 may transmit its location information 34, which is usable to determine the approximate location of the device 16, to the service provider 22. In another embodiment, the service provider 22 itself may determine the approximate location of the device 16 based on the particular communication networks that the device 16 uses to communicate with the service provider 22. For example, as shown in FIG. 6B, when the device 16 sends a request 36 it communicates on the Internet 32 or other communications network. When the service provider 22 receives the request 36, it can derive the location information 34 by identifying which network 32 the device 16 is communicating through. For example, by using triangulation techniques or by determining the location of the cellular tower from which the device 16 is transmitting from.

After the service provider 22 receives or determines the location information 34 relating to the device 16, the service provider 22 may compare the location information 34 to a location associated with a particular venue 12. As described above, the service provider 22 may have memory that stores information about the venue's 12 location or ranges 26-30 surrounding the venue 12. If the device's 16 location information 34 indicates that the device 16 is within a specified range 26-30 of the location associated with the venue 12, then the service provider 22 may cause content 18 to be transmitted to the user's device 16. For example, if the particular venue 12 is an amusement park in Atlanta, Ga. then the service provider 22 will have the location of the amusement park stored in memory. The service provider 22 will receive or determine the location information 34 relating to a device 16. Then the service provider 22 will determine whether that device 16 is within some predetermined range 26-30 of the Atlanta amusement park. If the device 16 is within the range 26-30, then the service provider 22 will transmit content 18 to the device 16.

In either embodiment, content 18 is transmitted to the user's device 16 depending upon the location of the device 16 as compared to the venue 12. If the device 16 is within a certain range 26-30 of the venue 12, it will receive the content 18. If the device 16 is not within a certain range 26-30 of the venue 12, it will not receive the content 18. As shown in FIG. 3, the specified ranges 26-30 and the content 18 may vary in different embodiments. The closest range 26 may be within the boundaries of the venue 12 itself. The median range 28 may be further out from the venue 12, such as on the parking lot or grounds of the venue 12. The furthest range 30 may be further out still, such as extending to neighboring blocks of the venue 12. The ranges 26-30 may vary depending upon preferences and the capabilities of the system 10. Although FIG. 3 shows three ranges 26-30, other embodiments may have more ranges, or some may have fewer ranges.

In certain embodiments, users 14 who are within the different ranges 26-30 may receive different content 18. For example, users 14 within the closest range 26 of a ballpark may receive content 18 that is a coupon for a hotdog at the concession stands. This content 18 might not be particularly useful to a user 14 who is outside of the furthest range 30, however because that user cannot access the concession stand. Therefore, a user 14 outside of the furthest range 30 might receive a coupon for discounted admission to tonight's game. This type of content 18 is beneficial because it would encourage users 14 who are not otherwise inside the venue 12 to enter the venue. As a further example, a user 14 who is within the median range 28—in the parking lot—might receive content 18 in the form of a text message that broadcasts the current score of the game. As yet another example, a user 14 who is within a grocery store might receive content 18 in the form of a daily special on pork chops, while a user 14 who is outside of the grocery store might receive content 18 in the form of coupons on Christmas trees that are stored in the grounds of the grocery store.

There may be some users 14 who are outside of the furthest range 30 and do not receive any content 18 at all. This may be due to limitations within the system 10, or simply preferences to only transmit content 18 to users 14 within a particular range. In certain embodiments, however, there could be a subscription service wherein any user 14—even if he is outside of the furthest range 30—may receive content 18. For example, a user 14 who is particularly interested in the Atlanta, Ga. location of the amusement park Six Flags may pay a subscription fee to receive specific content 18 about that venue 12. The user 14 would receive the content 18 even if he was located in Cartersville, Ga., a location that would otherwise be outside of the ranges 26-30 in system 10.

In certain embodiments of the invention as illustrated in FIG. 4, transmission of the content 18 may be based on time as well as location. In some embodiments, time-based transmission motivates users 14 who are already at or near the venue 12 to purchase goods. For example, in embodiments where the venue 12 is a ball park, during the seventh inning stretch the service provider 22 may transmit particular content 18 in the form of a coupon for a back-scratcher at the gift shop. Alternatively, where the venue 12 is a restaurant, the service provider 22 may transmit content 18 in the form of coupons for dinner at 5 pm, so that users 14 can receive the coupons in time for dinner.

In other embodiments, transmission of content may depend upon the amount of time that a user 14 remains at a particular venue 12. For example, there may be pre-determined ranges of time, such as a first range of 1 to 2 hours, a second range of 2 to 3 hours, and a third range of 3 hours or more. The examples of pre-determined time ranges are not limiting, however, and any time range may be used. If the user 14 is at the venue for only a first range of time, then the user 14 receives a first type of content 18. If the user 14 is at the venue for a second range of time, then the user 14 receives a second type of content 18, and so on. The types of content 18 may differ from one another, and may become more "valuable" to a user 14 as the user 14 remains at the venue 12 for more and more ranges.

For example, the venue 12 may be a Las Vegas casino. If the user 14 stays at the casino for the first range—or 1 to 2 hours—then the user 14 may receive a first type of content 18 in the form of a piece of software in a limited demonstration mode only. If the user 14 stays longer until the second range of time—2 to 3 hours—then the user 14 may receive a second type of content 18 in the form of the software with a full-use license. In this example, the content 18 became more "valuable" to the user 14 because the user 14 was granted more permission rights for the software. In other examples the content 18 may become more valuable based on dollar value, for example if the content 18 was a coupon for a buffet. The different levels of content 18 could be different dollar values for the coupon. In these embodiments the device 16 may send periodic transmissions to the service provider 22 so that the service provider 22 may calculate the amount of time that the user 14 and the device 16 are actually at the venue 12.

In other embodiments, time-based transmission of content 18 may be used to encourage users 14 who are not necessarily at the venue 12 to patronize the venue 12. For example, a retail store may publicly advertise that at 3 pm on a specified day, the retail store will transmit free content 18 to any user 14 who visits the retail store. The retail store may publicly advertise in advance of the specified day, so that users 14 can plan to attend the store on that day. This arrangement is beneficial because it drives users 14—potential customers—into the retail store. At 3 pm on the specified day, the users 14 who are located within the retail store will receive a transmission that may contain special content 18. For example, if the retail store sells music, then the special content 18 may be an audio file that contains a song from a recent album. Users 14 who receive the audio file will be motivated to purchase the entire album from the retail store.

Embodiments provide various benefits and advantages. First, content 18 may be transmitted to the user 14 in real-time when the user 14 is actually at the venue 12. Also, the user 14 does not have to perform follow-up work—such as uploading information to the Internet—to receive content 18 after leaving the venue 12. Instead, the content 18 is transmitted to the user 14 in real-time while he is still at the venue 12. In this manner, the user 14 may immediately enjoy the benefits of being in the venue 12, for example, by using a transmitted coupon to buy a hotdog at a ball game. Second, embodiments are beneficial because the user 14 does not necessarily have to navigate her way through the general home page and through a descending series of hyper-links to finally access the specific content. Instead, the specific content is presented immediately to the user.

Third, content may be identified and/or selectively transmitted based on venue. Thus, both the content that is transmitted (e.g., ski information, content tickets, etc.) and whether and how the content is transmitted can depend on a user's location relative to a venue. In other systems the content might be based on venue, but the transmission of the content is not because the user need not be at the venue. In such systems, any user anywhere can access content about a particular venue because receipt of content does not depend on whether the user is at a particular location. In contrast, in certain embodiments described herein both the transmission and content are based on venue. A user will or will not receive content depending on whether that user is within a certain venue, and the content itself may be tailored for the venue.

Figure 7:
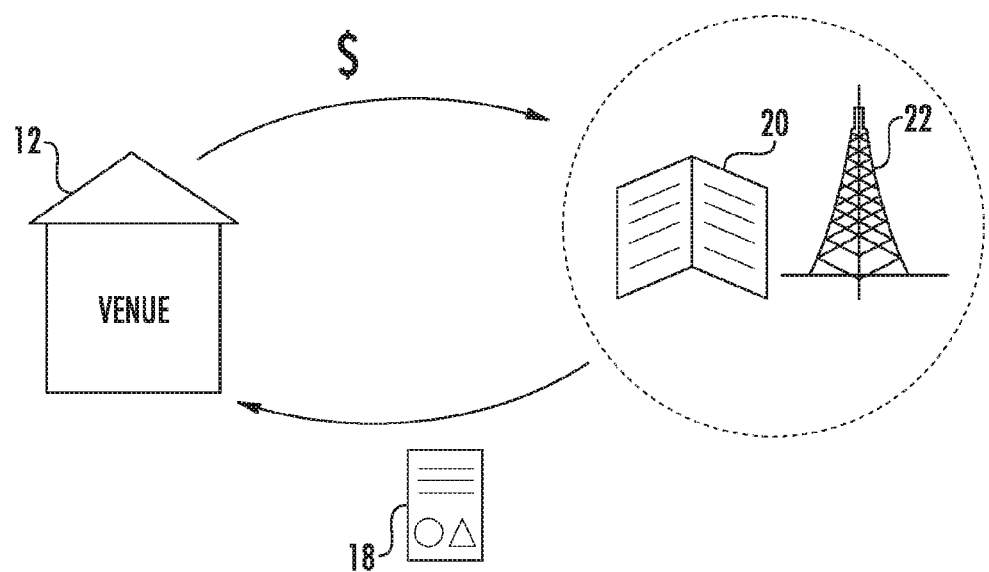
FIG. 7 shows an exchange between a venue, a content provider, and a service provider according to certain embodiments.

As illustrated in FIGS. 7-10, certain embodiments of the invention provide beneficial business pairings and exchanges between entities. FIG. 7 is a schematic showing an exchange between a venue 12, a content provider 20, and a service provider 22 according to certain embodiments of the invention. In FIG. 7 the content provider 20 and the service provider 22 are the same entity, as illustrated by the dashed circle that encompasses the two. In this embodiment, the venue 12 pays the combined provider 20, 22 compensation for both the content 18 itself and the transmission of the content 18. This embodiment is beneficial because interacting with a combined provider 20, 22 may be more efficient than having to interact each of a separate content provider 20 and a service provider 22.

Figure 8:
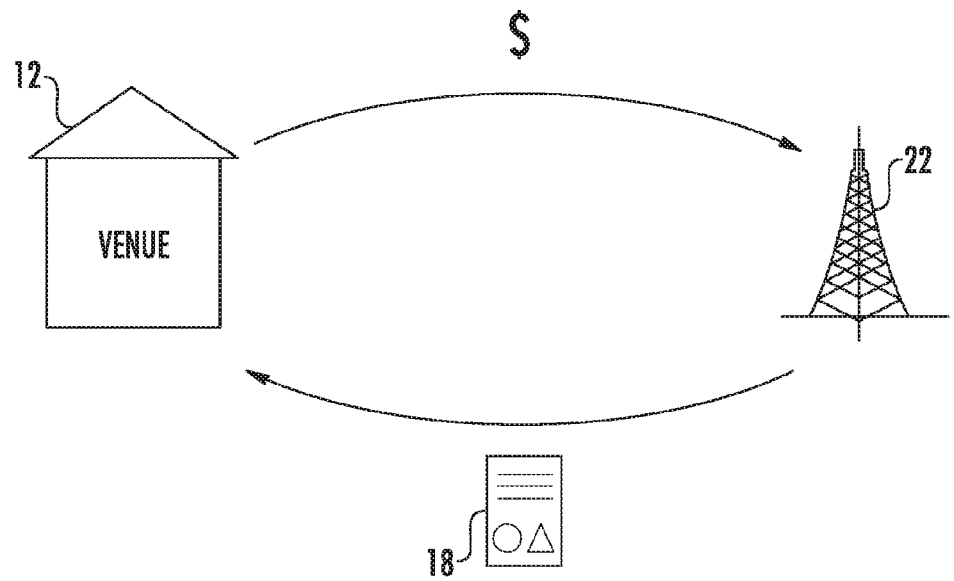
FIG. 8 shows an exchange between a venue and a service provider according to certain embodiments.

FIG. 8 is a schematic showing an exchange between a venue 12 and a service provider 22 according to certain embodiments of the invention. In this embodiment there is not a content provider 20 because the venue 12 supplies its own content. For example, the venue 12 could be a golf course that creates coupons for 9-hole rounds. The venue 12 could simply provide the coupons to the service provider 22, who would accordingly transmit the coupons to users 14. There is no need for a content provider 20 because the venue 12 can create its own content.

Figure 9:
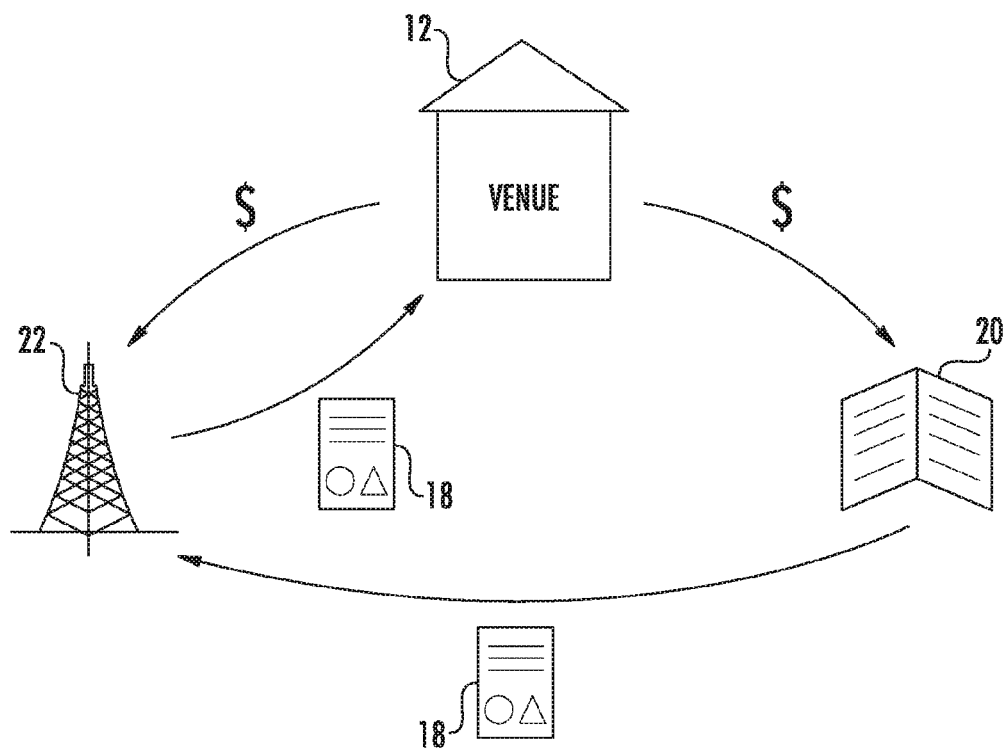
FIG. 9 shows an exchange between a venue, a content provider, and a service provider according to certain embodiments.

FIG. 9 is a schematic showing an exchange between a venue 12, a content provider 20, and a service provider 22 according to certain embodiments. In this embodiment the venue 12 pays the content provider 20 compensation for providing content 18. The content provider 20 creates the content 18 and forwards that content 18 on to the service provider 22. The service provider 22 in turn transmits content 18 to users 14 who are located at the venue 12. The venue 12 pays the service provider 22 in exchange for transmitting content 18. This embodiment is beneficial when the venue 12 cannot create the content 18 that it wishes to have transmitted. For example, the venue 12 may be a golf course that wishes to transmit content 18 in the form of weather forecasts. Most golf courses do not have the equipment and the expertise to create weather forecasts; accordingly, there may be a content provider 20 that is a meteorologist that creates the weather forecasts. This embodiment is also beneficial when the content provider 20 does not have the capability to transmit the content 18 by itself. In that case, there must be a separate service provider 22 to transmit the content 18 to users 14.

Figure 10:
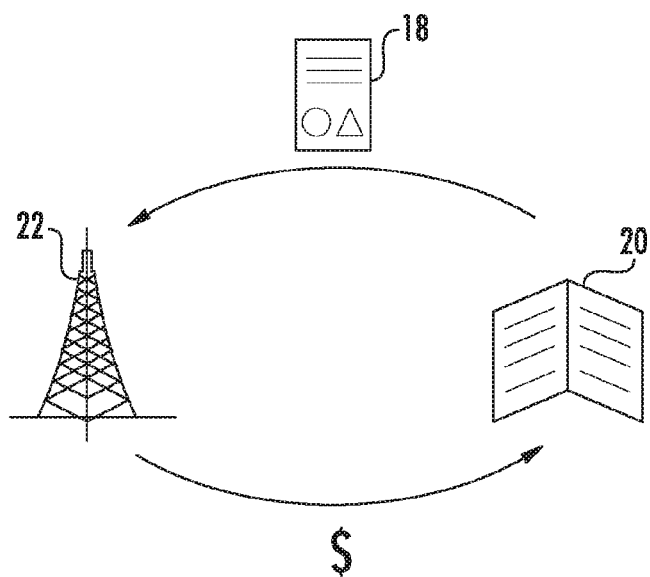
FIG. 10 shows an exchange between a content provider and a service provider according to certain embodiments.

FIG. 10 is a schematic showing an exchange between a content provider 22 and a service provider 20 according to certain embodiments. In this embodiment, there is not necessarily a venue 12 involved in the business transaction. The transmission is motivated by either provider 20, 22. For example, the content provider 20 could be a radio station that wants to promote ratings by hosting a meet-and-greet party with a famous recording artist. The radio station could publicly advertise that any listeners who attend the party will receive content 18 in the form of a free audio file containing a song of the recording artist. The radio station—who is the content provider 20 in this embodiment—could arrange with the service provider 22 to transmit the content 18 to users 14 at the party. There is not a venue 12 that initiates the transmission of content; rather, the transmission is initiated by the content provider 20 and the service provider 22. This embodiment is beneficial for entities who do not necessarily need users 14 to attend a particular venue, but simply want to attract users with a transmission for another business purpose.

As an alternative to FIG. 10, the service provider 22 could create and transmit the content 18 by itself. For example, the service provider 22 may be a cellular phone company that wants to promote a special on the purchase of a new cellular phone. The service provider 22 may create its own content 18 in the form of a discount on a new phone. The service provider 22 may publicly advertise that any users who come to the headquarters of the company will receive the discount. In this embodiment, the service provider 22 both creates the content and transmits it, but the transmission is still tied to the location of the user 14.

Certain services provide content that is ordinarily or generally available for a fee. For example, access to a news service provided on a webpage may normally be provided for a fixed monthly fee. In one exemplary method such fee-based content 18 is made available for free or at a discount based on the location of the user's device 16. For example, users 14 accessing the webpage in or near the news' services corporate headquarters may have free access (e.g., access regardless of whether there is a subscription account allowing access). As another example, a museum visit may pay an entrance fee to visit a museum venue and, as part of the benefit of the admission fee, users 14 may be able to access, view, and use content 18 and applications provided by the museum for a discount or for free while at the venue location. Potential visitors may be encouraged to visit the museum based on the free or discounted material available at the museum.

The foregoing description of exemplary embodiments has been presented only for the purposes of illustration and description and is not intended to be exhaustive or to limit the invention to the precise forms disclosed. Many modifications and variations to the structures and methods recited above and shown in the drawings are possible without departing from the scope or spirit of the above disclosure and the following claims. The embodiments were chosen and described in order to explain the principles of the invention and their practical application so as to enable others skilled in the art to make and utilize the invention and various embodiments and with various modifications as are suited to the particular use contemplated. Alternative embodiments will become apparent to those skilled in the art to which the present invention pertains without departing from its spirit and scope.

The invention claimed is:

1. A method for transmitting content to a device, comprising:
   receiving a request for content from a device, the request for content usable to identify an approximate location of the device;
   comparing the approximate location of the device with a location of a venue, wherein the venue is associated with at least one feature;
   tailoring the content based on the approximate location of the device relative to the location of the venue, the content being related to the venue;
   if the approximate location of the device is within a pre-determined range of the location of the venue, transmitting the content to the device for a first fee; and
   if the approximate location of the device is outside the pre-determined range, transmitting the content to the device for a second fee, wherein the first fee is less than the second fee.

2. The method as in claim 1, further comprising selecting the content from a plurality of content by determining whether the approximate location of the device is within a predetermined portion of the pre-determined range.

3. The method of claim 1, further comprising selecting the content from a plurality of content by determining whether the approximate location of the device has been within the pre-determined range for a pre-determined time range.

4. The method as in claim 1, wherein the content is transmitted to the device only if a time of transmission of the content corresponds to a pre-selected time or time range.

5. The method of claim 1, wherein the device comprises at least one of a computer, a cell phone, a pager, or a mobile electronic device.

6. The method of claim 1, wherein the content comprises at least one of applications, executable programs, text, SMS, or HTML files, mp3 or other audio files, websites, wallpapers or themes, graphic images, ringtones, advertisements, coupons, movies, animation clips, or photographs.

7. The method of claim 1, wherein the venue comprises a plurality of places, and the location of the venue is pre-determined as a location within one place.

8. The method of claim 1, wherein at least a portion of the content relates to the at least one feature.

9. The method of claim 1, wherein the first fee is free.

10. The method of claim 1, wherein the venue pays at least one of the first fee or the second fee.

11. The method of claim 1, wherein an owner of the device pays at least one of the first fee or the second fee.

12. A system for transmitting content to a device, comprising:
   a location comparison component executing in a memory of a computing device for receiving a request for content from a device, the request usable to identify an approximate location of the device, wherein the location comparison component compares the approximate location of the device with a location of a venue, wherein the venue is associated with at least one feature;
   a content selection component for selecting content stored in the memory in a database, wherein the content selection component tailors the content based on the approximate location of the device relative to the location of the venue, the content being related to the venue; and
   a transmission component for transmitting the content to the device for a first fee if the approximate location of the device is within a pre-determined range of the location of the venue, and for transmitting the content to the device for a second fee if the approximate location of the device is outside the pre-determined range, wherein the first fee is less than the second fee.

13. The system of claim 12, wherein the content selection component selects the content from a plurality of content by determining whether the approximate location of the device has been within the pre-determined range for a pre-determined time range.

14. The system of claim 13, wherein a first pre-determined time range corresponds to a first content, and a second pre-determined time range corresponds to a second content, and wherein the second pre-determined time range is longer than the first pre-determined time range.

15. The system of claim 12, wherein at least a portion of the content relates to the at least one feature.

16. The system of claim 12, wherein the content is an application that allows a user to input information and provides specialized content in response to the user input.

17. The system of claim 12, wherein the content: provides further information about the venue; is useable at the venue; is at least partial payment for an item or service for sale at the venue; is a promotion for an item or service for sale at the venue; or is an incentive to visit the venue again.

18. The system of claim 12, wherein the venue pays the first fee and an owner of the device pays the second fee.

19. A method for transmitting content to a device, comprising:
   receiving a request for content from a device;
   receiving location information relating to the device, the location information usable to identify an approximate location of the device;
   comparing the approximate location of the device with a location of a venue, wherein the venue is associated with at least one feature;
   tailoring the content based on the approximate location of the device relative to the location of the venue, the content being related to the venue;
   if the approximate location of the device is within a pre-determined range of the location of the venue, transmitting the content to the device for a first fee that is charged to the venue; and
   if the approximate location of the device is outside the pre-determined range, transmitting the content to the device for a second fee that is charged to the owner of the device, wherein the first fee is less than the second fee.

20. The method of claim 19, wherein the content is an application that receives user input and returns information that is related thereto in response to the user input.

21. The method of claim 19, wherein the content is an application that receives information related to a location from the user and returns a weather forecast in response to the user input.

22. The method of claim 21, wherein the information related to the location comprises at least one of the name of the venue, a zip code, an area code, a city, a state, or a county name.

23. The method of claim 19, wherein the content is an application that is installed on the device and executed on the device.

24. The method of claim 19, further comprising selecting the content from a plurality of content by determining whether the approximate location of the device has been within the pre-determined range for a pre-determined time range.

25. A system for transmitting content to a device, comprising:
   a location comparison component executing in memory of a computing device for receiving a request for content from a device, the request usable to identify an approximate location of the device, wherein the location comparison component compares the approximate location of the device with a location of a venue, wherein the venue is associated with at least one feature;
   a content selection component for selecting content from a plurality of content stored in the memory in a database by determining whether the approximate location of the device is within one of a plurality of pre-determined ranges of the location of the venue, wherein the content selection component tailors the content based on the approximate location of the device relative to the location of the venue, the content being related to the venue; and
   a transmission component for transmitting content to the device if the approximate location of the device is within one of the plurality of pre-determined ranges, wherein a first pre-determined range is within the venue and corresponds to a first content, and a second pre-determined range is outside of the venue and corresponds to a second content, and wherein the first content has a higher value than the second content.

26. The system of claim 25, wherein each of the plurality of content corresponds to each of the plurality of pre-determined ranges.

27. The system of claim 25, wherein at least a portion of the content relates to the at least one feature.

28. The system of claim 25, wherein the feature comprises at least one of access rights, a theme, a purpose, a person, event, a game, a sport, or an activity.

29. The system as in claim 25, wherein the transmission component only transmits the content to the device if a time of transmission of the content corresponds to a pre-selected time or time range.

30. A non-transitory computer-readable medium on which is encoded program code, the program code when executed by a processor executes a method comprising:
   receiving a request for content from a device;
   receiving location information relating to the device, the location information usable to identify an approximate location of the device;
   comparing the approximate location of the device with a location of a venue, wherein the venue is associated with at least one feature;
   tailoring the content based on the approximate location of the device relative to the location of the venue, the content being related to the venue; and
   transmitting content to the device if the approximate location of the device is within a pre-determined range of the location of the venue, wherein at least a portion of the content relates to the at least one feature, and wherein a first pre-determined range is within the venue and corresponds to a first content, and a second pre-determined range is outside of the venue and corresponds to a second content, and wherein the first content has a higher value than the second content.

* * * * *